US011727681B2

(12) United States Patent
Scott-Green et al.

(10) Patent No.: US 11,727,681 B2
(45) Date of Patent: Aug. 15, 2023

(54) MEDIA ANNOTATION WITH PRODUCT SOURCE LINKING

(71) Applicant: GOOGLE LLC, Mountain View, CA (US)

(72) Inventors: Henry Scott-Green, Marina del Rey, CA (US); Anjali Malik, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/627,991

(22) PCT Filed: Apr. 8, 2019

(86) PCT No.: PCT/US2019/026381
§ 371 (c)(1),
(2) Date: Dec. 31, 2019

(87) PCT Pub. No.: WO2020/209835
PCT Pub. Date: Oct. 15, 2020

(65) Prior Publication Data
US 2022/0027624 A1    Jan. 27, 2022

(51) Int. Cl.
*G06V 20/20*    (2022.01)
*G06F 16/957*    (2019.01)
(Continued)

(52) U.S. Cl.
CPC ............ *G06V 20/20* (2022.01); *G06F 16/957* (2019.01); *G06F 40/134* (2020.01); *G06T 5/00* (2013.01)

(58) Field of Classification Search
CPC . G06K 9/00671; G06F 16/957; G06F 40/134; G06T 5/00
See application file for complete search history.

(56) References Cited

U.S. PATENT DOCUMENTS

2005/0185060 A1    8/2005  Neven
2007/0260671 A1    11/2007 Harinstein et al.
(Continued)

FOREIGN PATENT DOCUMENTS

JP    2014-022921 A    2/2014
JP    5801792 B2    10/2015
(Continued)

OTHER PUBLICATIONS

International Search Report and Written Opinion for Application No. PCT/US2016/026381, dated Dec. 10, 2019, 13 pages.
(Continued)

*Primary Examiner* — Matthew C Bella
*Assistant Examiner* — Kathleen M Broughton
(74) *Attorney, Agent, or Firm* — Lowenstein Sandler LLP (57) ABSTRACT

Technology is disclosed for annotating and source linking the objects displayed in an image. An example method including detecting, by a processing device, an object in an image; associating the object in the image with a source indicator; annotating, by the processing device, the image to indicate the object is associated with the source indicator; receiving a user selection of the object in the image; and identifying a source based on the source indicator and on contextual data associated with the user selection, wherein the source comprises information about the object.

20 Claims, 5 Drawing Sheets

(51) Int. Cl.
*G06F 40/134* (2020.01)
*G06T 5/00* (2006.01)

(56) References Cited

U.S. PATENT DOCUMENTS

| | | | | |
|---|---|---|---|---|
| 2010/0260426 | A1* | 10/2010 | Huang | G06V 10/10 |
| | | | | 707/E17.031 |
| 2012/0140069 | A1* | 6/2012 | Ding | H04N 21/6582 |
| | | | | 348/143 |
| 2012/0167145 | A1* | 6/2012 | Incorvia | H04N 21/812 |
| | | | | 725/60 |
| 2013/0063561 | A1* | 3/2013 | Stephan | H04N 13/261 |
| | | | | 348/46 |
| 2013/0166382 | A1 | 6/2013 | Cassidy et al. | |
| 2014/0019248 | A1 | 1/2014 | Stoliartchouk et al. | |
| 2014/0146082 | A1 | 5/2014 | So | |
| 2014/0157306 | A1 | 6/2014 | Deo et al. | |
| 2015/0326925 | A1* | 11/2015 | Ozkan | H04N 21/466 |
| | | | | 725/36 |
| 2017/0161772 | A1* | 6/2017 | Xu | G06F 16/2455 |
| 2018/0082125 | A1* | 3/2018 | Katz | G06N 3/08 |
| 2019/0057150 | A1* | 2/2019 | An | G06V 40/169 |

FOREIGN PATENT DOCUMENTS

| | | | | |
|---|---|---|---|---|
| KR | 20140108493 A | * | 9/2014 | |
| KR | 20170105478 A | * | 9/2017 | |
| WO | WO-2013151552 A1 | * | 10/2013 | G06Q 30/02 |
| WO | WO-2014142758 A1 | * | 9/2014 | G06Q 30/0241 |
| WO | WO-2018176017 A1 | * | 9/2018 | G06F 40/211 |

OTHER PUBLICATIONS

India Office Action for Application No. 202147049980 dated Mar. 28, 2022, 6 pages.

"Frame it for Success With Our Custom iFrames in WIREWAX Studio", WireWax Interactive Video Technology, Images downloaded Dec. 5, 2018, http://pages.wirewax.com/webinars-videotutorials/p/1, length of video 3:58.

Japanese Office Action for Application No. 2021-559660 dated Nov. 7, 2022, 5 pages.

* cited by examiner

MEDIA ANNOTATION WITH PRODUCT SOURCE LINKING

TECHNICAL FIELD

This disclosure relates to image analysis and, in particular, to supplementing image content with sources that provide information about objects displayed in the image content.

BACKGROUND

Many computing devices include content sharing aspects that enable users to capture, view, and share media content. The media content may be videos or still images that display features of an object. The object may be a product that is the focus of the media content (e.g., primary product) or may be an auxiliary product that is in the background. A viewer may see the object in the media item and be interested in obtaining more information about the object.

SUMMARY

The following presents a simplified summary of various aspects of this disclosure in order to provide a basic understanding of such aspects. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description presented later.

According to a first aspect of the present disclosure there is provided a method comprising detecting an object in an image, associating the object in the image with a source indicator, annotating the image to indicate the object is associated with the source indicator, receiving a user selection of the object in the image, and identifying a source based on the source indicator and on contextual data associated with the user selection, wherein the source comprises information about the object.

In another aspect of the present disclosure, the image comprises one or more frames of a video and the object is, for example a product, displayed in the one or more frames. The detecting may involve detecting a set of objects (e.g., set of products) in the one or more frames of the video. The processing device may further determine a viewer preference based viewership data of the video and select an object from the set of objects based on the viewer preference. The viewership data may indicate a preference of one or more current viewers, future viewers, or past viewers of the image.

In yet another aspect, the method may identify the source by determining a plurality of sources that are associated with the object based on the source indicator and selecting the source from the plurality of sources based on the contextual data associated with the user selection. The contextual data may comprise, for example, a geographic location of a user viewing the image, a source preference of the user, or an availability of the object at a time of the user selection. The processing device may further provide a source identifier for the source to a viewer of the image.

In a further aspect, detect the object in the image may involve performing digital image processing on image data of the image and recognizing the object in the image based on the digital image processing. The detected object may then be annotated by updating a presentation of the image to emphasize the object. In one example, the updating may involve at least one of outlining, highlighting, color altering, or brightening a portion of the image.

In a further aspect, receiving a user selection of the object in the image may comprise receiving an indication that a user has selected a portion of the image comprising the object.

According to a second aspect, the present disclosure is a system comprising a processing device configured to detect an object in an image, associate the object in the image with a source indicator, annotate the image to indicate the object is associated with the source indicator, receive a user selection of the object in the image, and identify a source based on the source indicator and on contextual data associated with the user selection, wherein the source comprises information about the object.

According to a third aspect, the present disclosure is a computer program product configured such that, when processed by a processing device, the computer program product causes the processing device to detect an object in an image, associate the object in the image with a source indicator, annotate the image to indicate the object is associated with the source indicator, receive a user selection of the object in the image, and identify a source based on the source indicator and on contextual data associated with the user selection, wherein the source comprises information about the object.

The individual features and/or combinations of features defined above in accordance with any aspect of the present disclosure or below in relation to any specific embodiment may be utilized, either separately and individually, alone or in combination with any other defined feature, in any other aspect or embodiment. Furthermore, the present disclosure is intended to cover apparatus configured to perform any feature described herein in relation to a method and/or a method of using or producing, using or manufacturing any apparatus feature described herein.

BRIEF DESCRIPTION OF THE DRAWINGS

The present disclosure is illustrated by way of example, and not by way of limitation, in the figures of the accompanying drawings, in which.

DETAILED DESCRIPTION

Modern computer systems often enable a content creator to manually modify a media item to alter image content and include details about objects (e.g., products) shown in the media item. The modifications often require specialized image editing software and involve the content creator manually editing image content to add a reference to an object (e.g., an arrow and text label). The image modifications made by the creator may be permanent and may be displayed to all the users even though some of the users may be more interested in one of the other objects in the image. Editing the image content to add references may be a time consuming process and may add content that is obtrusive to the viewing experience. Content creator may alternatively add references for the object in the description of the media item but these often remain hidden if the user does not view an expanded version of the description. In addition, the references added may include a static web address to a particular source, such as a retailer that may stop providing information for the object if the product is no longer available (e.g., newer product released, out of inventory, geographically limited).

Aspects of the present disclosure address the above and other deficiencies by providing technology that can enhance image content to emphasize particular objects and to indicate sources for the objects. That is, aspects of the present disclosure provide a guided human-machine interaction process to assist a user performing a technical task. The sources may provide additional information about the creation, use, or sale of the objects. In one example, the technology may involve detecting objects in an image using object recognition techniques. The image may be a still image or a video frame and a recognized object may be linked to a source (e.g., web server) that provides more information about the object. The technology may annotate the image to indicate to a viewer that the object is associated with a source indicator that can be used to identify a particular source. The annotation may emphasize the object by outlining, highlighting, or making any other type of modification to the image. When a viewer selects the emphasized object, the technology may determine the best source to provide to the particular viewer based on contextual data of the user selection, which may include time data, location data, or availability data (e.g., language availability or product availability). When the image or images (e.g., video) include a set of multiple objects, the technology may select a subset of the recognized objects based on viewership data. The viewership data may indicate preferences of past, current, or future viewers and may enable the technology to choose objects that are more interesting to the viewers.

Systems and methods described herein include technology to enhance graphical user interfaces to enable viewers to more efficiently identify a source that provides information about a particular object displayed in an image. In particular, aspects of the technology may provide viewers an indication of an object's source in a more optimized manner. The more optimized manner may be less obtrusive then adding labels and pointers and more apparent than including a list of static web addresses in a description or comment field. Aspects of the technology may also annotate and identify sources automatically (without user input) based on current or expected viewership. This may be done for a particular viewer or set of viewers and may be performed after a content creator has shared the media item but before, during, or after the viewer has requested to consume the media item. For example, the technology may determine the user is interested in a particular type of object and may annotate objects of that type in the media item (e.g., video) after the user has requested the media item.

Various aspects of the above referenced methods and systems are described in details herein below by way of examples, rather than by way of limitation. The examples provided below discuss the technology in the context of a content sharing platform that may enable end users to upload media items and share media items. In other examples, the technology may apply to enhance existing broadcast mechanisms for providing media to end users. The media items discussed below include image data, however, the teaching of the present disclosure may be applied to forms of media that are absent images (e.g., audio, executable instructions, text) and the annotations may be provided via any form of human perceivable signal.

Figure 1:
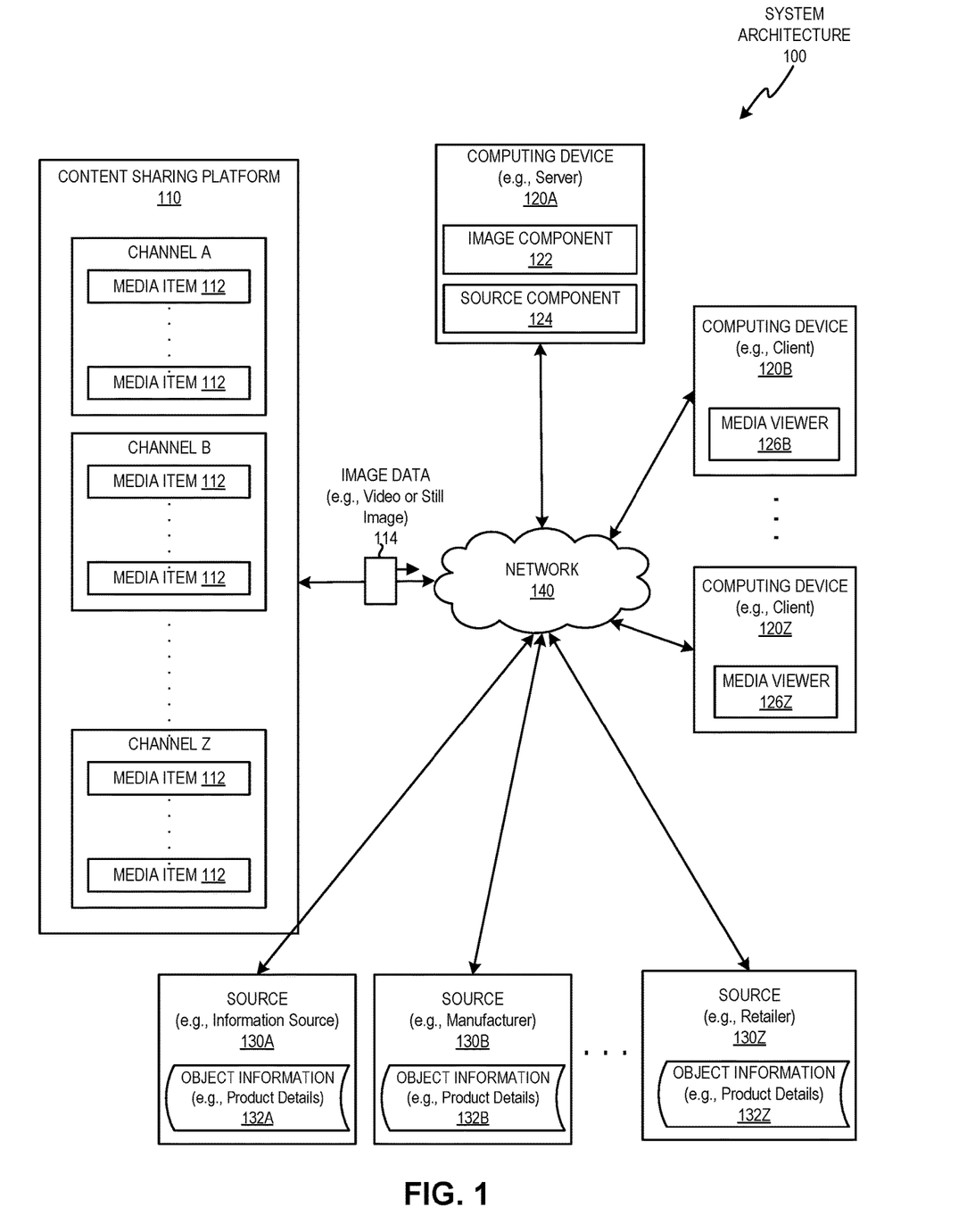
FIG. 1 illustrates an example system architecture in accordance with an implementation of the disclosure.

FIG. 1 illustrates an example system architecture 100, in accordance with an implementation of the disclosure. The system architecture 100 may include a content sharing platform 110, computing devices 120A-Z, sources 130A-Z, and a network 140.

Content sharing platform 110 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, hardware components, or combinations thereof that may be suitable for implementing the various features described herein. In some implementations, the content sharing platform 110 may enable the user to edit an uploaded media item 112, which may be associated with one or more channels (e.g., Channel A, Channels B-Z) or playlists (not shown) or be an independent media item. Media item 112 may include an image that may be transmitted (e.g., downloaded or streamed) as image data 114 to computing devices 120A-Z.

Computing device 120A may access image data 114 from content sharing platform 110 and may supplement image data 114 to annotate and embed links to one or more information sources. Computing device 120A may be part of the content sharing platform 110 or a separate server and provide annotation and source linking services to computing devices 120B-Z that are functioning as clients. In the example shown in FIG. 1, computing device 120A may include an image component 122 and a source component 124. Image component 122 may be used to analyze image data 114 and recognize objects represented by image data 114. Image data 114 may include data of a still image or of one or more frames of a video and may be enhanced to annotate the objects. Source component 124 may enable computing device 120A to supplement the image data 114 with a source indicator that corresponds to one of the recognized objects. The source indicator may enable computing devices 120B-Z to determine a source that provides information about the object. There may be many available sources and source component 124 may enable computing device 120A to provide the source that is optimal for a particular viewer, as will be discussed in greater detail below.

Sources 130A-Z may be devices that store information about at least one of the recognized objects. The device may include one or more computing devices, storage devices, other devices, or a combination thereof. A source may be remotely accessible to one of the computing devices 120A-Z via an external network (e.g., internet) or may be locally accessible to one of the computing devices 120A-Z via an internal network (e.g., Local Area Network (LAN), enterprise bus). Sources 130A-Z may be operated by the same entity that operates computing device 120A (e.g., content sharing entity) or may be operated by a different entity (e.g., third party). The different entity may be involved in the production, distribution, design, marketing, manufacturing, maintenance, support, or sale of the object. In one example, source 130 may be a web server operated by an entity that provides the object and may contain object information 132.

Object information 132 may be data that describes an aspect of the object. The object may be a tangible or intangible product and object information 132 may include information about the object that can be presented to a user. The information about the object may provide details about the object or a related object and may include descriptive information (e.g., product summary, technical specifications, models, versions), availability information (e.g., release dates, retailers, inventory, similar products), location information (e.g., regions/countries where the object is available or can be shipped to), price information (e.g., purchase cost, subscription cost, advertiser bids), other information, or a combination thereof.

Computing devices 120B-Z may include one or more computing devices that function as clients and may consume services provided by computing device 120A, content sharing platform 110, or a combination thereof. Computing devices 120B-Z may be referred to as "client devices" or "user devices" and may include personal computers (PCs), laptops, smart phones, tablet computers, netbook computers etc. Computing devices 120B-Z may each be associated with an individual user (e.g., viewer, owner, operator) that may use the computing device to access image data 114. Computing devices 120B-Z may each be owned and utilized by different users at different geographical locations.

Computing devices 120B-Z may include media viewers 126B-Z that provide viewers with a user interface to consume and select portions of image data 114. A media viewer may be any program that enables a computing device to present an image to a user and enable the user to select a region of interest within the image. The image may be displayed as part of one or more videos, web pages, documents, books, other media, or a combination thereof. The media viewer may be integrated with one or more other programs and may access, retrieve, present, and/or navigate content (e.g., web pages such as Hyper Text Markup Language (HTML) pages, digital media items, etc.). The media viewer may render, display, and/or present content to a viewing user. In one example, the media viewer may be embedded within an internet browser and the image may be embedded in a web page (e.g., a web page that may provide information about a product sold by an online merchant). In another example, the media viewer 126A may be a stand-alone application (e.g., a mobile app) that allows users to view the media items (e.g., digital videos, digital photos, electronic books, etc.).

Network 140 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

Figure 2:
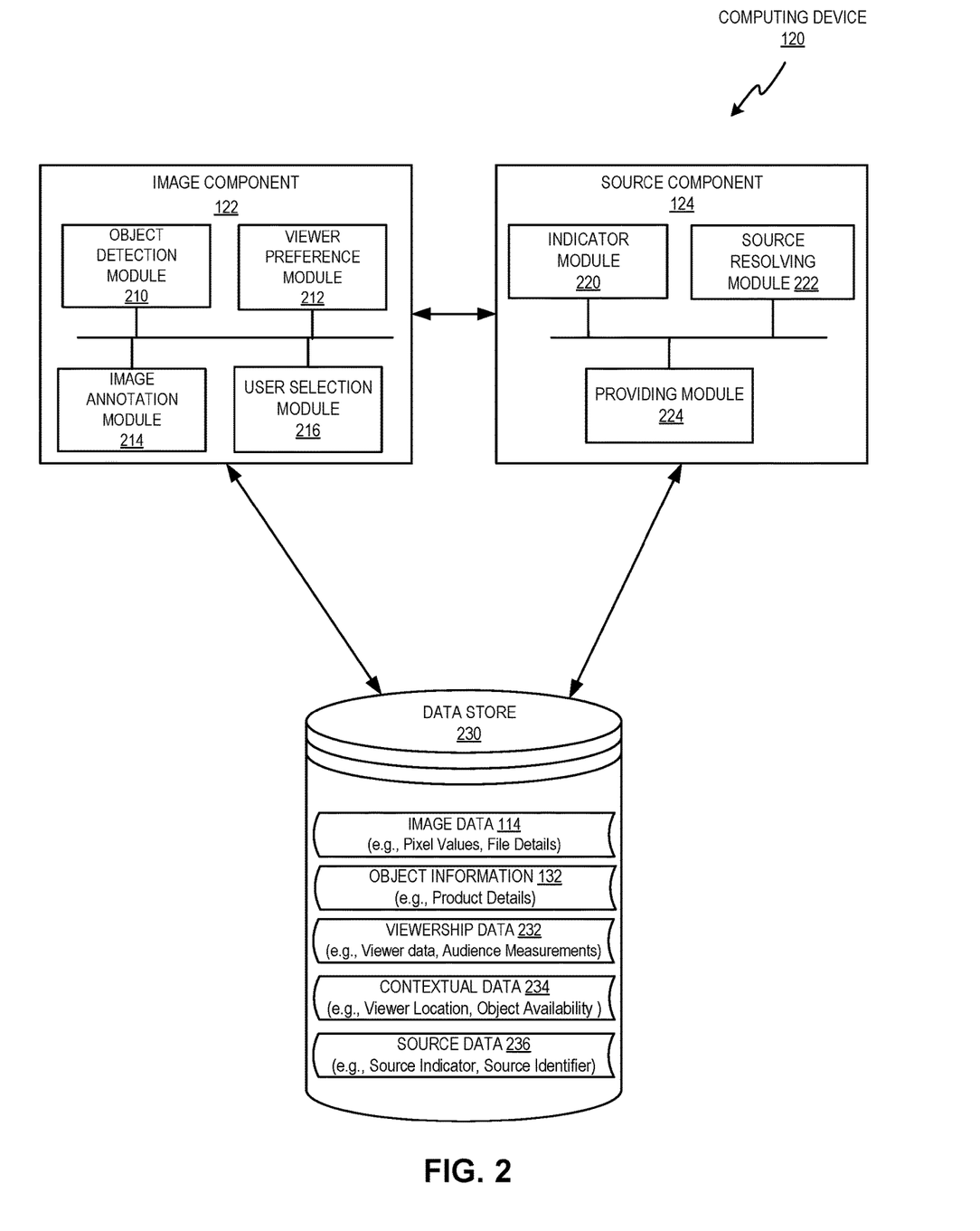
FIG. 2 is a block diagram illustrating a computing device with an image component and a source component in accordance with an implementation of the disclosure.

FIG. 2 depicts a block diagram illustrating an exemplary computing device 120 that includes technology for supplementing an image with source indicators for one or more objects in the image. Computing device 120 may be the same as one or more of the computing devices 120A-Z of FIG. 1. The components illustrated may include more or less components or modules without loss of generality. For example, two or more of the components may be combined into a single component, or features of a component or module may be divided into two or more components. In one implementation, one or more of the components may reside on different computing devices (e.g., a server device and a client device).

In general, functions described in one implementation as being performed by computing device 120 may be performed by multiple different computing devices 120A-Z in other implementations. For example, the computing device 120 may execute a program that performs one or more of the functions of image component 122 and a different device may perform one or more of the functions of source component 124. The functionality attributed to a particular component can be performed by different or multiple components operating together. In the example shown in FIG. 2, computing device 120 may include image component 122 and source component 124.

Image component 122 may enable computing device 120 to analyze an image and recognize one or more objects represented in the image. The image may be an artifact that depicts a visual perception of an object and may be the same or similar to a still image (photo, picture, drawing, rendering, painting), one or more frames of a video (e.g., motion picture), other image, or a combination thereof. The image may be captured by a camera device and be a part of a media item (e.g., web page, video, executable). The image may be shared or transferred to computing device 120 via a content sharing platform 110, digital storage device, other digital transfer mechanism, or a combination thereof. Computing device 120 may receive multiple images and store them in data store 230 as image data 114.

Image data 114 may include image details and image content. The image details may include information about the image such as a title, description, comments, storage location, file name, author, source, file size, duration, format, resolution, image dimensions, edit or creation time, other details, or a combination thereof. The image content of the image may include pixel data that represents pixel values or changes to pixel values and may be used for rendering the image. Both the image content and image data may indicate the objects being depicted in the image.

The objects in the image may be any object that can be perceived by a human and may include tangible or intangible products, goods, services, other deliverables, or a combination thereof. Tangible objects may be touched by a human and may include physical products, merchandise, goods, or other object. Intangible objects may be perceived directly or indirectly by a human without being touched and may include music, computer programs, services, other intangible element, or a combination thereof.

In one example, image component 122 may include an object detection module 210, a viewer preference module 212, an image annotation module 214, and a user selection module 216. Object detection module 210 may analyze the image data to detect an object in the image. Object detection module 210 may use the image details (e.g., title, description, comments), the image content (e.g., pixel values), or a combination thereof to determine an object in the image. When using the image content, object detection module 210 may perform digital image processing on the image content of the image. The digital image processing may involve segmenting the image content into one or more segments and applying one or more object recognition techniques (e.g., object classifiers) to detect an object within the one or more segments of the image. The object detection module 210 may be performed on the images individually (e.g., on a particular frame) or on a series of images and may or may not take into account object motion across frames. Object detection module 210 may identify objects with or without using input from the user. The user may provide input before the objects are recognized (e.g., creator indicates a region with an object) or after the objects are recognized (e.g., selecting a subset of objects from a list).

Viewer preference module 212 may determine preferences of one or more viewers based on viewership associated with the image. The viewership may be based on past, current, or future viewers of the image or of other similar images. A past viewer may have viewed the image and may no longer be viewing the image whereas a current viewer may have started viewing the image and may still be viewing the image. For example, when the image is a video, the user may have started watching the video and is still watching the video. A future viewer may be a viewer that has not seen the image but may see the image in the future. The future viewer may also be referred to as an expected viewer or potential viewer. The future viewer may be determined based on historical behavior of the viewer or on behavior of one or more similar viewers. For example, the future viewer may have consumed or subscribed to content of a channel or playlist and may have not received the image but is expected to receive and consume the image in the future. The viewership of the image may be stored in data store 230 as viewership data 232.

Viewership data 232 may include data about the viewers and data about the image content being viewed. The data may include one or more measurements for a specific viewer (e.g., current viewer) or for a plurality of viewers (e.g., audience). In one example, viewership data 232 may include characteristics of a group of viewers, consumption data, other data, or a combination thereof. The characteristics of the group of viewers may provide details about the group of viewers and may include, for example, viewers' location, language, and/or other similar information. Consumption data may be specific to a viewer or specific to the image content and may include a duration of consumptions, quantity of viewers, drop off rates, portions re-watched, portions paused or zoomed in on, other measurement, or a combination thereof.

Viewer preference module 212 may determine a preference of one or more viewers based on viewership data 232, image data 114, object data, other data, or a combination thereof. The preferences may indicate what types of objects are of interest to one or more of the viewers and may be used to determine which objects to annotate and provide source indicators for. In one example, the characteristics (e.g., location, language, etc.) and historical media consumption of the viewer or audience may be used to identify a preference for a particular object or type of object. In another example, the consumption of a video by a particular user may indicate a preference. For example, if the user re-watches a portion of a video that displays an aspect of the object or zooms in to better view the object, the viewer preference module 212 may determine the viewer or a similar viewer is interested in the object. This may be quantified and weighted and used to select which of the recognized objects should be annotated by image annotation module 214 in a subsequent portion of the video or in another video that may be consumed by this viewer.

Image annotation module 214 may enable computing device 120 to annotate the image to emphasize one or more of the detected objects. The image annotations may indicate to the viewer that the object is associated with additional information that can be accessed via the graphical user interface. Annotating the image may involve updating a presentation of the image by changing either the image content of the object, the image content surrounding the object, or a combination thereof. Image annotation module 214 may add content to the image or remove content from the image to emphasize an object. In one example, annotating the image may involve outlining, highlighting, brightening, darkening, color changes, zooming in or out, cropping, or a combination thereof. The area taken up by the annotation may be dependent on the characteristics of the individual computing devices 120B-Z, such as screen size, or of the software being used to view the image, such as window size. The annotated portion may comprise screen coordinates, which correspond to the object in the image. In the example of a video, as the object moves during playback of the video, the annotated portion may also move with the object.

Image annotation module 214 may utilize the data of object detection module 210 and viewer preference module 212 to choose which objects to emphasize in the image. As discussed above, an image (e.g., still image or video) may include many objects and some of the objects may be primary objects that are the focus of the image (e.g., product being reviewed) and other objects may be auxiliary objects that are in the background or foreground (e.g., other products in video). When a set of multiple objects are recognized, image annotation module 214 may choose to annotate all of the objects in the set or a subset of the objects (e.g., not all recognized objects). The latter may be advantageous because annotating all of the objects may be obtrusive or distracting and may adversely affect the viewing experience. Additionally, annotating all of the objects may lead to an increased processing burden. As such, there may be a tradeoff between annotating a sufficient number of objects to provide an improved user interface and reducing the processing burden associated with said annotations. Determining which objects to annotate may be based on the preferences discussed above and may involve analyzing data of the preferences, viewership, image, object, other data, or a combination thereof. Additionally, or alternatively, determining which objects to annotate may be based on processing capabilities. For example, image annotation module 214 may determine the processing capabilities of individual computing devices 120B-Z, and selectively annotate the image based on the processing capabilities of computing devices 120B-Z. In this way, a more computationally powerful computing device may receive more annotations than a less powerful computing device. Any other characteristics of the computing device may be used, such as screen size or resolution, or window size of a media player displaying the image. Larger window sizes may be able to accommodate more annotations than smaller window sizes, for example. Some or all of the data (e.g., measurements) may be weighted and used to generate a score (e.g., object preference score) and the score of an object may be compared to a threshold value. One or more of the objects with a score that satisfies the threshold (above or below threshold) may be chosen for annotation and source linking.

An object may be chosen and emphasized at any time before the image is presented to the viewer. For example, the image may be annotated before, during, or after it is captured by a camera, edited by an author, provided to a content distributer (e.g., content sharing platform, advertiser, broadcaster), requested by a viewer device, transmitted to a viewer device, loaded by a media viewer, rendered by the media viewer, displayed by the media viewer, other time, or a combination thereof. In one example, the image may be annotated by modifying the image content (e.g., pixel values) of an original image. In another example, the image may be annotated by applying one or more layers to the original image without modifying the original image. The one or more layers may correspond to the one or more objects being annotated (e.g., one-to-one or one-to-many) and some or all of the layers may be sent to the computing device of the viewer. In either example, the server or client may choose to provide annotations for objects based on the hardware and/or software used by, or the location of, the current viewer, and/or that the current viewer would be most interested in, which may be a subset of the recognized objects.

User selection module 216 may enable computing device 120 to detect a user selection of one or more of the emphasized objects in the annotated image. The user selection may be provided by the user (e.g., viewer) and received by computing device 120 in the form of user input. The user input may correspond to a region of the image and may include gestures (e.g., touch or touchless gestures), mouse input, keyboard input, eye tracking, device movement (e.g., shaking), other user input, or a combination thereof. In response to user input, user selection module 216 may determine the object being selected by the user and store contextual data 234. In an implementation, user selection corresponds with a user selecting a region comprising the annotated portion. A user wanting more information about an object that has been annotated may select the object by, for example, clicking a mouse or touching a screen at the location of the annotated object. In the example of a video, as described above, as the object moves relative to a screen during playback of the video, the annotated portion may also move with the object. Thus, implementations of the disclosed subject matter provide an improved user interface, which assists a user in performing a technical task.

Contextual data 234 may indicate the context of the user selection and may be based on data captured at a time before, during, or after the user selection. Contextual data 234 may correspond to a geographic location of a user, or an availability of the object at a time of the user selection, a source preference of the user, other feature, or a combination thereof. Contextual data 234 may be used by source component 124 to determine a particular source for the viewer.

Source component 124 may enable computing device 120 to supplement the image with a source that can provide additional information about the object in the image. The source may be identified using source data 236 before, during, or after a user selects an object. Source data 236 may include a source indicator, a source identifier other data, or a combination thereof. In the example shown in FIG. 2, source component 124 may include an indicator module 220, a source resolving module 222, and a providing module 224.

Indicator module 220 may associate the recognized object with a source indicator. In one example, indicator module 220 may associate the object that is in the image with the source indicator by linking the source indicator with a particular annotation of the image (e.g., object outline X corresponds to source indicator Y). The data of the source indicator may then be embedded within the image, included in the media item containing the image, or transmitted by the service providing the image or media item. The data of the source indicator may be hidden from the viewer or may be visible to the viewer (e.g., URL in description or comments).

The source indicator may include data that can be subsequently used to identify a source. The source indicator may be a generic source indicator that may indicate that a source exists but may not specify a particular source. The source indicator may include object identification data that may correspond to the particular object in the image. The object identification data may be a link, unique identifier, symbol, or coder that corresponds to a particular object in the image and may include numeric or non-numeric data. The object identification data may identify objects at any level of specificity, for example, it may indicate one or more of the object's category (e.g., phone, beverage, automobile), type (e.g., smart phone, soda bottle, cereal box, car), brand (e.g., Apple®, Coca Cola®, General Mills®, BMW®), model (e.g., iphone X, Coke Zero, Cheerios, X7), line (e.g., X plus, 16 oz glass bottle, Honey Nut, sport package), other level of specificity, or a combination thereof. In one example, the object identification data may be human readable or machine readable and may be based on a Universal Resource Locator (URL), a Universal Product Code (UPC), Stock Keeping Unit (SKU), a barcode (Quick Response (QR) code), a Global Trade Item Number (GTIN), International Article Number (EAN), a Vehicle Identification Number (VIN), an International Standard Book Number (ISBN), other data, or a combination thereof. In one example, the source indicator may identify a particular product but may not identify a particular source for the product (e.g., a specific retailer). The particular source may be determined based on data of the source indicator by using source resolving module 222 before, during, or after a user selection has been detected.

Source resolving module 222 may analyze the source indicator and context data associated with the user selection to identify a particular source. As discussed above, multiple sources may have information for the selected object and source resolving module 222 may select one of the sources to provide to the viewer. Resolving the source indicator may involve determining a set of candidate sources and selecting a subset (e.g., one or more) of the sources to provide to the user. In one example, the source indicator may include a link to an internal or external service (e.g., source aggregator, marketplace) that provides candidate sources. Source resolving module 222 may use the link, the object identification data, and the contextual data to identify a set of candidate sources and to select one of the sources. In one example, the set of candidate sources may include multiple retailers that provide information about the source and enable a viewer to purchase the object. Source resolving module 222 may then use contextual data 234 to select the source that is best for the viewer. This may involve selecting one of the sources based on one or more of the following weighted or unweighted factors, such as, price, inventory, delivery date, location, return policy, retailer preferences, other information, or a combination thereof.

Providing module 224 may enable computing device 120 to provide the source to the computing device of the viewer. This may involve one or more levels of abstraction or redirection. In one example, a web server may be accessed by the computing device of a viewer via a generic source indicator and may return a source identifier for a particular source. The computing device of the viewer may access the source using the source identifier (e.g., URL) to obtain and present the object information. In another example, providing module 224 may use the source identifier to retrieve the object information from the source and may transmit the object information to the computing device of the viewer (e.g., viewer device not accessing source directly). In either example, the object information may be accessible to the computing device of the viewer and presented to the viewer.

Data store 230 may include memory (e.g., random access memory), a drive (e.g., a hard drive, solid state drive), a database system, a cache mechanism, or other type of component or device capable of storing data. Data store 230 may also include multiple storage components (e.g., multiple drives or multiple databases) that may span multiple computing devices (e.g., multiple server computers). In some implementations, data store 230 may be cloud-based. One or more of the components may utilize the data store 230 to store public and private data and data store 230 may be configured to provide secure storage for private data.

In situations in which the systems discussed here collect personal information about users (e.g., viewers), or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 3:
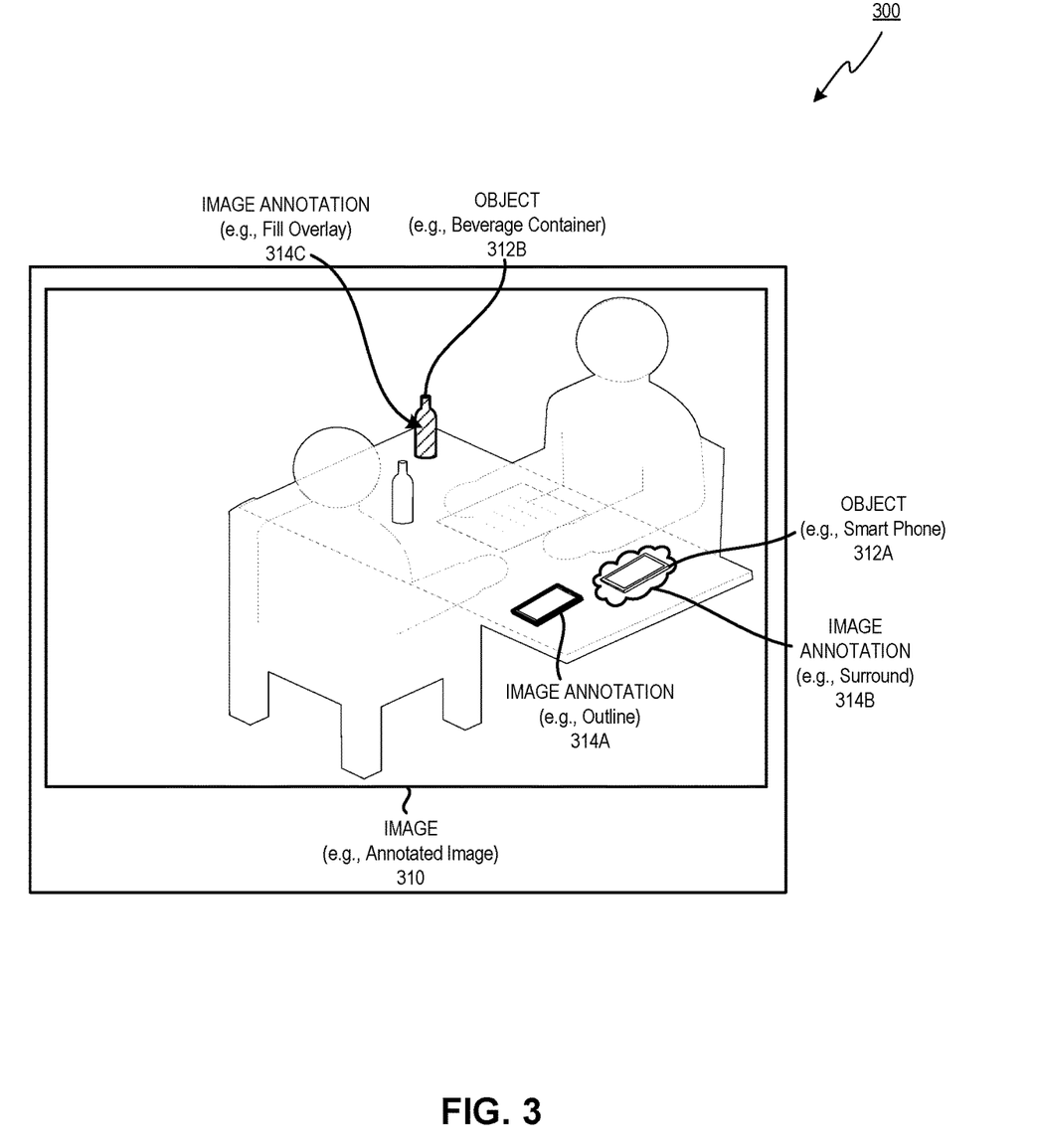
FIG. 3 is an exemplary user interface that displays an image with an annotated object, in accordance with an implementation of the disclosure.

FIG. 3 depicts an exemplary user interface 300 that illustrates how the technology may present image annotations to a viewer. User interface may display image 310 with one or more image annotations 314A-C. Image annotations 314A-C may emphasize one or more objects within image 310, such as object 312A (e.g., smart phone) and object 312B (e.g., beverage container). Image annotations 314A-C may be contained within the original image 310 or may be one or more layers displayed over image 310. Image annotations 314A-C may correspond to particular objects 312A-B and may include outlining an object (e.g., image annotation 314A), surrounding an object (e.g., image annotation 314B), filling an object (e.g., image annotation 314C), other annotation to emphasize an object, or a combination thereof.

Figure 4:
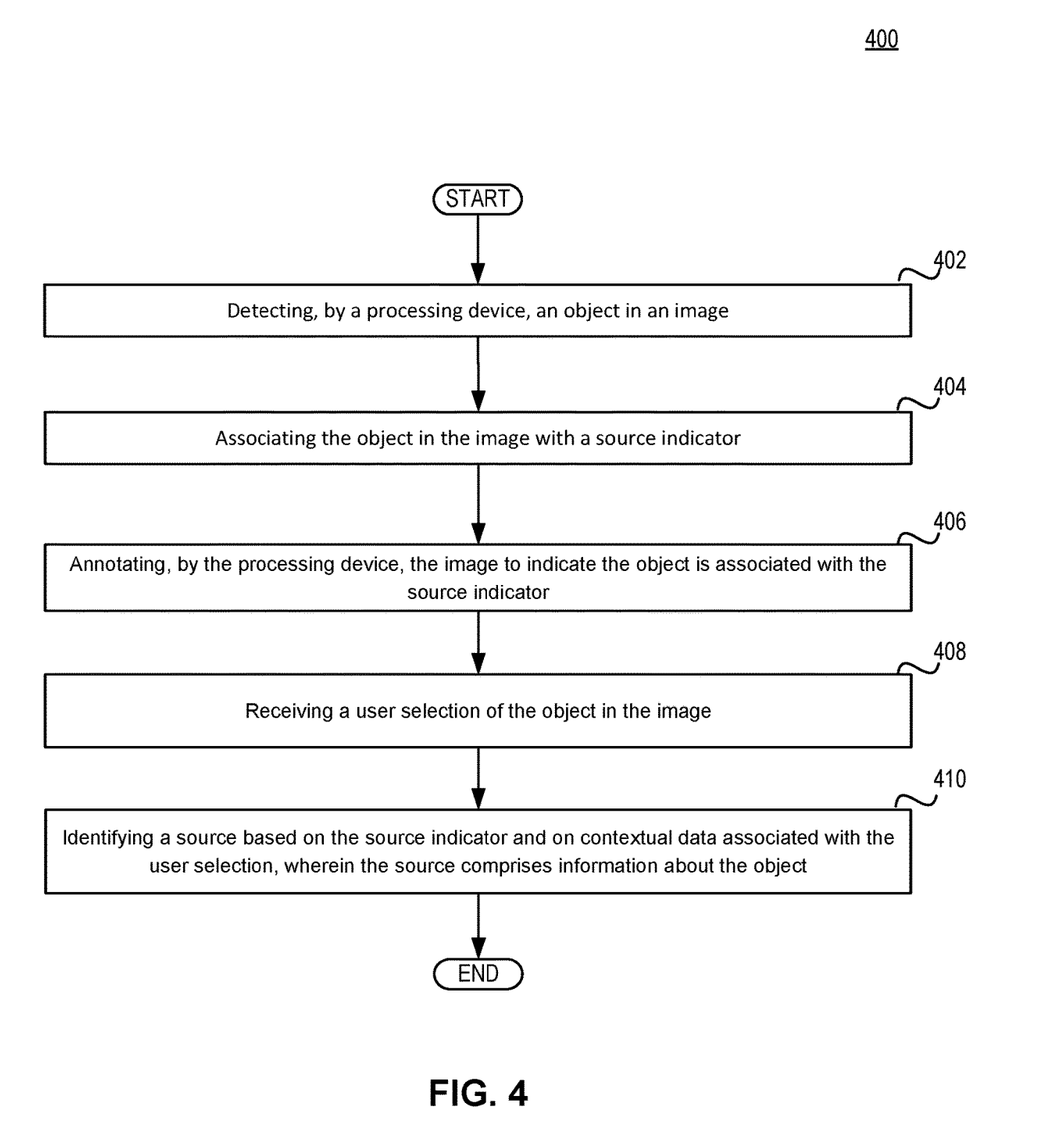
FIG. 4 is a flow diagram illustrating a method for annotating an image to emphasize an object and to link the object with a particular source of information, in accordance with an implementation of the disclosure.

FIG. 4 depicts a flow diagram of an example method 400 for annotating and source linking one or more objects in an image, in accordance with one or more aspects of the present disclosure. Method 400 and each of its individual functions, routines, subroutines, or operations may be performed by one or more processors of the computer devices executing the method. In certain implementations, method 400 may be performed by a single computing device. Alternatively, methods 400 may be performed by two or more computing devices, each computing device executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states or events via a state diagram. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by image component 122 and source component 124 of FIGS. 1 and 2.

Method 400 may be performed by processing devices of a server device or a client device and may begin at block 402. At block 402, a processing device may detect an object in an image. The object may be a product and may be displayed within multiple images (e.g., frames) of a user generated video (e.g., product review). In one example, detecting the object may involve performing digital image processing on image data to recognize the object in the image. In another example, detecting the object may involve receiving user input (e.g., content creator gesture) that identifies one or more locations or regions in the image that correspond to the object. The image may be a part of a media item (e.g, video, web page, mobile app, e-book) and may be a still image or one or more frames of a video.

In one example, the frames of the video may include multiple objects and the processing device may annotate the objects that are most interesting to the viewer. This may involve the processing device detecting the set of objects and determining a viewer preference based on viewership data of the video. The processing device may select one or more objects that are likely to be interesting based on the viewership data. The viewership data may indicate a preference of one or more current viewers, future viewers, or past viewers of the image or a related image (e.g., different image/video from same source).

At block 404, the processing device may associate the object in the image with a source indicator. The source indicator may be a high-level source indicator that may indicate that a source exists but may not identify a particular source. The source indicator may include data that can be used by a server device or client device to identify the particular source.

At block 406, the processing device may annotate the image to indicate the object is associated with the source indicator. Annotating the image may involve updating a presentation of the image in a user interface to emphasize the one or more objects chosen from the set. The updating may involve at least one of outlining, highlighting, color altering, or brightening a portion of the image.

At block 408, the processing device may receive a user selection of the object in the image via the user interface. The user selection may be based on input of a user (e.g., gesture) that identifies one of the objects. For example, the user may click on, or touch the object in the image. In response to the user selection, the processing device may capture contextual data that includes a geographic location of a user viewing the image, a source preference of the user, an availability of the object at a time of the user selection, other data, or a combination thereof.

At block 410, the processing device may identify a source based on the source indicator and on contextual data associated with the user selection. The source may include the information about the object and may provide the information to a computing device to be presented to the viewer of the image in the user interface. In one example, identifying the source may involve determining a set of sources associated with the object based on the source indicator. The processing device may further select one or more sources from the set based on the contextual data associated with the user selection. The processing device may also provide source identifiers for the selected one or more sources for presentation to the viewer of the image in the user interface.

Responsive to completing the operations described herein above with references to block 410, the method may terminate.

Figure 5:
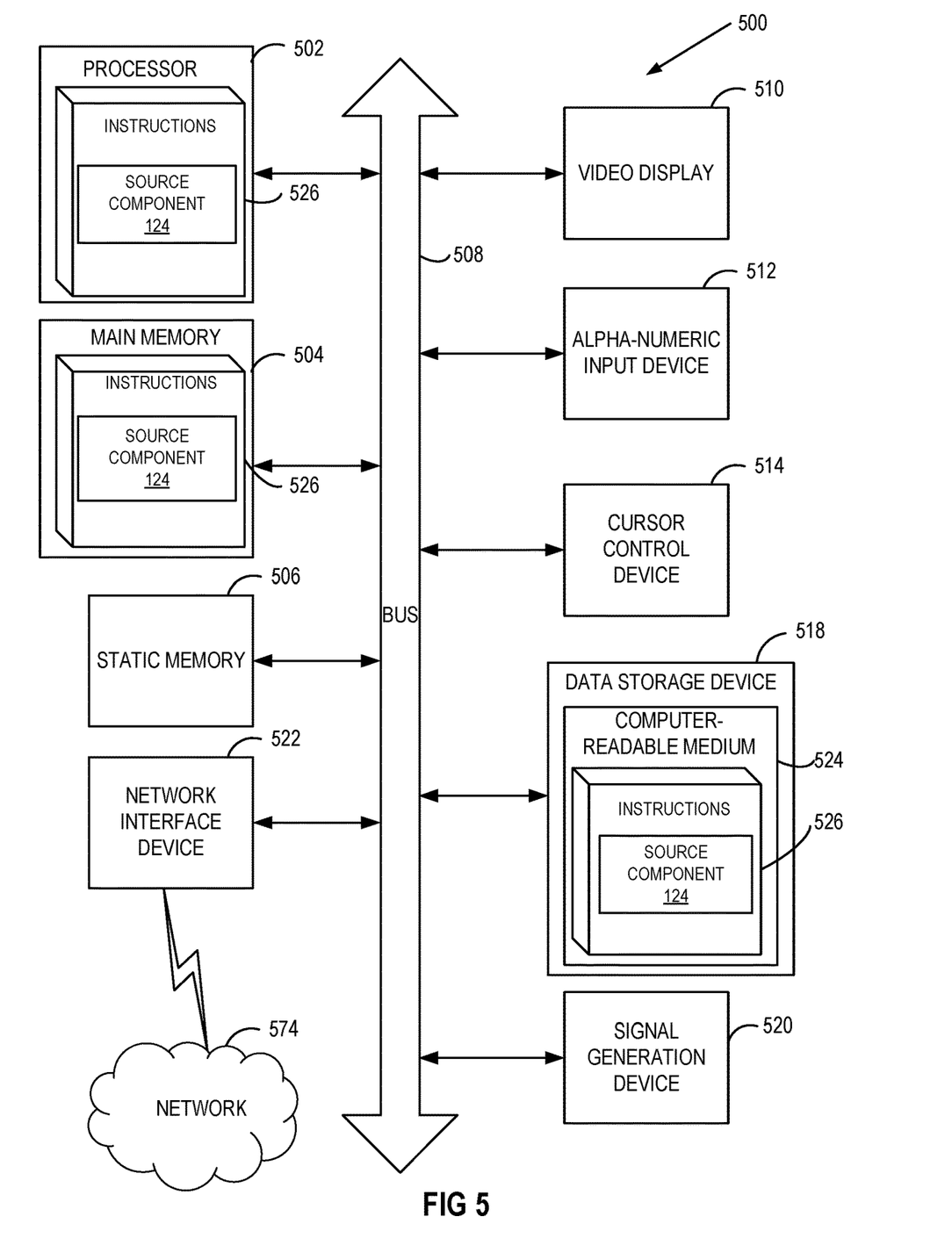
FIG. 5 is a block diagram illustrating an exemplary computer system in accordance with an implementation of the disclosure.

FIG. 5 illustrates a diagrammatic representation of a machine in the exemplary form of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 500 may be utilized by or illustrative of one or more of the computing devices 120A-Z.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a DSP, network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD), a cathode ray tube (CRT), or a touch screen), an alphanumeric input device 512 (e.g., a keyboard), a cursor control device 514 (e.g., a mouse), and a signal generation device 520 (e.g., a speaker).

The data storage device 518 may include a computer-readable storage medium 524 on which is stored one or more sets of instructions 526 (e.g., software) embodying any one or more of the methodologies or functions described herein. The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 574 (e.g., the network 140) via the network interface device 522.

In one implementation, the instructions 526 include instructions for one or more source components 124, which may correspond to the identically-named counterpart described with respect to FIGS. 1 and 2. While the computer-readable storage medium 524 is shown in an exemplary implementation to be a single medium, the terms "computer-readable storage medium" or "machine-readable storage medium" should be taken to include a single medium or multiple media (e.g., a centralized or distributed database, and/or associated caches and servers) that store the one or more sets of instructions. The terms "computer-readable storage medium" or "machine-readable storage medium" shall also be taken to include any transitory or non-transitory computer-readable storage medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "transmitting", "generating", "causing", "adding", "subtracting", "inserting", "including", "removing", "extracting", "analyzing", "determining", "enabling", "identifying", "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus, device, or system for performing the operations herein. This apparatus, device, or system may be specially constructed for the required purposes, or it may include a general purpose computer selectively activated or reconfigured by a computer program stored in the computer. Such a computer program may be stored in a computer- or machine-readable storage medium, such as, but not limited to, any type of disk including floppy disks, optical disks, compact disk read-only memories (CD-ROMs), and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Reference throughout this specification to "an implementation" or "one implementation" means that a particular feature, structure, or characteristic described in connection with the implementation is included in at least one implementation. Thus, the appearances of the phrase "an implementation" or "one implementation" in various places throughout this specification are not necessarily all referring to the same implementation. Moreover, it is noted that the "A-Z" notation used in reference to certain elements of the drawings is not intended to be limiting to a particular number of elements. Thus, "A-Z" is to be construed as having one or more of the element present in a particular implementation.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    detecting, by a processing device, a set of objects depicted in an image;
    selecting an object from the set of objects detected in the image that satisfies one or more criteria based on at least viewership data, wherein the viewership data indicates information about a plurality of viewers comprising two or more of: one or more current viewers of the image, one or more future viewers of the image, or one or more past viewers of the image;
    associating the selected object in the image with a source indicator;
    responsive to associating the selected object in the image with the source indicator, annotating, by the processing device, the image to indicate the object is associated with the source indicator;
    receiving a user selection of the object in the image; and
    identifying a source based on the source indicator and on contextual data associated with the user selection, wherein the source comprises information about the object.

2. The method of claim 1, wherein the image comprises one or more frames of a video and wherein the object is displayed in the one or more frames.

3. The method of claim 2, wherein the viewership data comprises consumption data, and wherein the consumption data comprises a measurement based on one or more of a portion of the video that is paused, a portion of the video that is zoomed in on, a portion of the video that is re-watched, a duration of the consumption, a quantity of the at least one of the one or more current viewers, the one or more future viewers, or the one or more past viewers, or a drop off rate of the at least one of the one or more current viewers, the one or more future viewers, or the one or more past viewers.

4. The method of claim 1, wherein the viewership data indicates a preference of the one or more current viewers, the one or more future viewers, or the one or more past viewers.

5. The method of claim 1, wherein identifying the source comprises:
    determining a plurality of sources that are associated with the object based on the source indicator;
    selecting the source from the plurality of sources based on the contextual data associated with the user selection; and
    providing a source identifier for presenting the source to a viewer of the image.

6. The method of claim 1, wherein the contextual data comprises a geographic location of a user viewing the image, a source preference of the user, or an availability of the object at a time of the user selection.

7. The method of claim 1, wherein annotating the image comprises updating a presentation of the image in a user interface to emphasize the object, wherein the updating comprises at least one of outlining, highlighting, color altering, or brightening a portion of the image.

8. The method of claim 1, wherein receiving a user selection of the object in the image comprises receiving an indication that a user has selected a portion of the image comprising the object in a user interface.

9. The method of claim 1, wherein detecting the set of objects in the image comprises:
    performing digital image processing on image data of the image; and
    recognizing one or more of the objects in the image based on the digital image processing.

10. A system comprising:
    a memory; and
    a processing device communicably coupled to the memory, the processing device to execute instructions to carry out operations comprising:
        detecting a set of objects depicted in an image;
        selecting an object from the set of objects detected in the image that satisfies one or more criteria based on at least viewership data, wherein the viewership data indicates information about a plurality of viewers comprising two or more of: one or more current viewers of the image, one or more future viewers of the image, or one or more past viewers of the image;
        associating the selected object in the image with a source indicator;
        responsive to associating the selected object in the image with the source indicator, annotating, by the processing device, the image to indicate the object is associated with the source indicator;
        receiving a user selection of the object in the image; and identifying a source based on the source indicator and on contextual data associated with the user selection, wherein the source comprises information about the object.

11. The system of claim 10, wherein the image comprises one or more frames of a video and wherein the object is displayed in the one or more frames.

12. The system of claim 11, wherein the viewership data comprises consumption data, and wherein the consumption data comprises a measurement based on one or more of a portion of the video that is paused, a portion of the video that is zoomed in on, a portion of the video that is re-watched, a duration of the consumption, a quantity of the at least one of the one or more current viewers, the one or more future viewers, or the one or more past viewers, or a drop off rate of the at least one of the one or more current viewers, the one or more future viewers, or the one or more past viewers.

13. A non-transitory computer-readable storage medium having instructions stored thereon that, when executed by a processing device, cause the processing device to perform operations comprising:
  detecting a set of objects depicted in an image;
  selecting an object from the set of objects detected in the image that satisfies one or more criteria based on at least viewership data, wherein the viewership data indicates information about a plurality of viewers comprising two or more of: one or more current viewers of the image, one or more future viewers of the image, or one or more past viewers of the image;
  associating the selected object in the image with a source indicator;
  responsive to associating the selected object in the image with the source indicator, annotating, by the processing device, the image to indicate the object is associated with the source indicator;
  receiving a user selection of the object in the image; and
  identifying a source based on the source indicator and on contextual data associated with the user selection, wherein the source comprises information about the object.

14. The non-transitory computer-readable storage medium of claim 13, wherein the image comprises one or more frames of a video and wherein the object is displayed in the one or more frames.

15. The non-transitory computer-readable storage medium of claim 13, wherein the viewership data indicates a preference of the one or more current viewers, the one or more future viewers, or the one or more past viewers.

16. The non-transitory computer-readable storage medium of claim 13, wherein identifying the source comprises:
  determining a plurality of sources that are associated with the object based on the source indicator;
  selecting the source from the plurality of sources based on the contextual data associated with the user selection; and
  providing a source identifier for presenting the source to a viewer of the image.

17. The non-transitory computer-readable storage medium of claim 13, wherein the contextual data comprises a geographic location of a user viewing the image, a source preference of the user, or an availability of the object at a time of the user selection.

18. The non-transitory computer-readable storage medium of claim 13, wherein annotating the image comprises updating a presentation of the image in a user interface to emphasize the object, wherein the updating comprises at least one of outlining, highlighting, color altering, or brightening a portion of the image.

19. The non-transitory computer-readable storage medium of claim 13, wherein receiving a user selection of the object in the image comprises receiving an indication that a user has selected a portion of the image comprising the object in a user interface.

20. The non-transitory computer-readable storage medium of claim 13, wherein detecting the set of objects in the image comprises:
  performing digital image processing on image data of the image; and
  recognizing one or more of the objects in the image based on the digital image processing.

* * * * *